US009769194B2

(12) United States Patent
Iverson

(10) Patent No.: US 9,769,194 B2
(45) Date of Patent: Sep. 19, 2017

(54) ACCESSIBLE CONTENT REPUTATION LOOKUP

(75) Inventor: Kristofer N. Iverson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 975 days.

(21) Appl. No.: 13/050,585

(22) Filed: Mar. 17, 2011

(65) Prior Publication Data

US 2011/0167328 A1    Jul. 7, 2011

Related U.S. Application Data

(63) Continuation of application No. 11/759,401, filed on Jun. 7, 2007, now Pat. No. 7,966,553.

(51) Int. Cl.
*H04L 1/00*    (2006.01)
*H04L 29/06*   (2006.01)

(52) U.S. Cl.
CPC ............................. *H04L 63/1441* (2013.01)

(58) Field of Classification Search
CPC .. H04L 63/1441; H04L 63/1483; H04L 67/02
USPC .................................................. 715/205, 738
See application file for complete search history.

(56) References Cited

U.S. PATENT DOCUMENTS

| 5,572,643 | A | 11/1996 | Judson |
| 6,182,129 | B1 * | 1/2001 | Rowe ................ G06F 17/30899 707/E17.119 |
| 6,367,012 | B1 | 4/2002 | Atkinson et al. |
| 6,563,514 | B1 * | 5/2003 | Samar ............................ 715/711 |
| 6,571,256 | B1 | 5/2003 | Dorian et al. |
| 6,745,367 | B1 | 6/2004 | Bates et al. |
| 6,819,336 | B1 | 11/2004 | Nielsen |
| 6,892,178 | B1 | 5/2005 | Zacharia |
| 7,003,522 | B1 | 2/2006 | Reynar et al. |
| 7,107,530 | B2 | 9/2006 | Blakely et al. |
| 7,539,776 | B1 | 5/2009 | Saare et al. |

(Continued)

OTHER PUBLICATIONS

Office action for U.S. Appl. No. 12/859,679, mailed on May 7, 2013, Colvin et al., "Reputation-based Safe Access User Experience", 14 pages.

(Continued)

*Primary Examiner* — Stephen Hong
*Assistant Examiner* — Marshon Robinson
(74) *Attorney, Agent, or Firm* — Arent Fox LLP

(57) ABSTRACT

Implementations of accessible content reputation lookup are described. In one implementation, before a user activates a link in a document, such as a hyperlink on a webpage, the user can designate the link. For example, the user can float a cursor over the link or interact with an icon placed proximate to the link. By designating the link, the user can request reputation information associated with the link, including information as to whether or not content associated with the link, an application used to access the content, and/or source(s) on which the content resides, are known to be dangerous or risky. If the reputation information indicates that the link is safe to activate, the user can activate the link and access the content. Alternately, if the reputation information indicates that the link is unsafe to access, the user can choose to forego activation of the link.

17 Claims, 7 Drawing Sheets

(56) References Cited

U.S. PATENT DOCUMENTS

| | | | |
|---|---|---|---|
| 7,562,304 B2* | 7/2009 | Dixon | G06F 17/30861 |
| | | | 705/35 |
| 7,580,982 B2 | 8/2009 | Owen et al. | |
| 7,797,421 B1* | 9/2010 | Scofield et al. | 709/224 |
| 7,831,915 B2 | 11/2010 | Averbuch et al. | |
| 7,870,203 B2 | 1/2011 | Judge et al. | |
| 7,886,032 B1 | 2/2011 | Louz-On | |
| 7,930,289 B2 | 4/2011 | Cheshire | |
| 7,966,553 B2 | 6/2011 | Iverson | |
| 8,166,155 B1 | 4/2012 | Rachmeler et al. | |
| 8,281,361 B1 | 10/2012 | Schepis et al. | |
| 8,434,149 B1 | 4/2013 | Satish et al. | |
| 2002/0147779 A1* | 10/2002 | Bates | G06Q 10/107 |
| | | | 709/206 |
| 2002/0169826 A1* | 11/2002 | Yano | H04L 12/1822 |
| | | | 709/203 |
| 2003/0018585 A1 | 1/2003 | Butler et al. | |
| 2003/0028762 A1 | 2/2003 | Trilli et al. | |
| 2003/0097591 A1 | 5/2003 | Pham et al. | |
| 2003/0188019 A1 | 10/2003 | Wesley | |
| 2004/0122926 A1 | 6/2004 | Moore et al. | |
| 2004/0187079 A1 | 9/2004 | Yamada et al. | |
| 2004/0210602 A1 | 10/2004 | Hillis et al. | |
| 2005/0050470 A1 | 3/2005 | Hudson et al. | |
| 2005/0240456 A1* | 10/2005 | Ward et al. | 705/7 |
| 2005/0246761 A1 | 11/2005 | Ross et al. | |
| 2005/0262026 A1 | 11/2005 | Watkins | |
| 2006/0004914 A1 | 1/2006 | Kelly et al. | |
| 2006/0015722 A1 | 1/2006 | Rowan et al. | |
| 2006/0095404 A1 | 5/2006 | Adelman et al. | |
| 2006/0200554 A1* | 9/2006 | Shen | G06F 11/328 |
| | | | 709/224 |
| 2006/0218403 A1* | 9/2006 | Sauve et al. | 713/175 |
| 2006/0253580 A1 | 11/2006 | Dixon et al. | |
| 2006/0253581 A1* | 11/2006 | Dixon et al. | 709/225 |
| 2006/0253582 A1 | 11/2006 | Dixon et al. | |
| 2006/0253583 A1* | 11/2006 | Dixon et al. | 709/225 |
| 2006/0253584 A1 | 11/2006 | Dixon et al. | |
| 2007/0011603 A1 | 1/2007 | Makela | |
| 2007/0050716 A1 | 3/2007 | Leahy et al. | |
| 2007/0078699 A1 | 4/2007 | Scott et al. | |
| 2007/0118898 A1 | 5/2007 | Morgan et al. | |
| 2007/0124414 A1 | 5/2007 | Bedingfield, Sr. et al. | |
| 2007/0136279 A1 | 6/2007 | Zhou et al. | |
| 2007/0136806 A1 | 6/2007 | Berman | |
| 2007/0162349 A1 | 7/2007 | Silver | |
| 2007/0168490 A1 | 7/2007 | Kent et al. | |
| 2007/0192855 A1 | 8/2007 | Hulten et al. | |
| 2007/0208613 A1 | 9/2007 | Backer | |
| 2007/0250916 A1 | 10/2007 | Shull et al. | |
| 2008/0021958 A1 | 1/2008 | Foote | |
| 2008/0022384 A1 | 1/2008 | Yee et al. | |
| 2008/0082662 A1 | 4/2008 | Dandliker et al. | |
| 2008/0086361 A1* | 4/2008 | Eliezerov | 705/10 |
| 2008/0109306 A1 | 5/2008 | Maigret et al. | |
| 2008/0109473 A1 | 5/2008 | Dixon et al. | |
| 2008/0114709 A1 | 5/2008 | Dixon et al. | |
| 2008/0196099 A1 | 8/2008 | Shastri | |
| 2008/0243920 A1 | 10/2008 | Newman et al. | |
| 2008/0256187 A1 | 10/2008 | Kay | |
| 2008/0288278 A1 | 11/2008 | Buss | |
| 2008/0307044 A1 | 12/2008 | Musson | |
| 2009/0076994 A1 | 3/2009 | Ghosh et al. | |
| 2009/0204677 A1 | 8/2009 | Michaelis et al. | |
| 2009/0282052 A1 | 11/2009 | Evans et al. | |
| 2009/0300012 A1 | 12/2009 | Levow et al. | |
| 2010/0042487 A1 | 2/2010 | Barazani | |
| 2010/0057895 A1 | 3/2010 | Huang | |
| 2010/0076890 A1 | 3/2010 | Low et al. | |
| 2010/0153404 A1 | 6/2010 | Ghosh et al. | |
| 2010/0174795 A1 | 7/2010 | Adelman et al. | |
| 2010/0223251 A1 | 9/2010 | Adelman et al. | |
| 2010/0235918 A1 | 9/2010 | Mizrahi et al. | |
| 2010/0268739 A1 | 10/2010 | Zalepa | |
| 2010/0332837 A1 | 12/2010 | Osterwalder | |
| 2011/0004693 A1 | 1/2011 | Rehfuss | |
| 2011/0030058 A1 | 2/2011 | Ben-Itzhak et al. | |
| 2011/0087647 A1 | 4/2011 | Signorini et al. | |
| 2011/0126259 A1 | 5/2011 | Krishnamurthi et al. | |
| 2011/0126289 A1 | 5/2011 | Yue et al. | |
| 2011/0154227 A1* | 6/2011 | Kang | G06F 3/1204 |
| | | | 715/760 |
| 2011/0173683 A1 | 7/2011 | Roach | |
| 2011/0191849 A1 | 8/2011 | Jayaraman et al. | |
| 2011/0225652 A1 | 9/2011 | Emigh et al. | |
| 2011/0258201 A1 | 10/2011 | Levow et al. | |
| 2012/0131636 A1 | 5/2012 | Ross et al. | |

OTHER PUBLICATIONS

Office Action for U.S. Appl. No. 12/637,673, mailed on Feb. 3, 2012, Ameya S. Bhatawdekar, "Reputation Based Redirection Service", 16 pgs.

Office action for U.S. Appl. No. 12/859,679, mailed on Aug. 8, 2012, Colvin et al., "Reputation-based Safe Access User Experience", 15 pages.

Office action for U.S. Appl. No. 12/637,673, mailed on Sep. 28, 2012, Bhatawdekar et al., "Reputation Based Redirection Service", 18 pages.

Garuba, et al., "Preventing parameterized vulnerability in Web based applications", Fourth International Conference on Information Technology, Apr. 2007, pp. 1-4.

Jain, et al., "Secure Group Browsing", International Conference on Advances in Infrastructure for Electronic Business, Education, Science, Medicine, and Mobile Technologies on the Internet, Jan. 2003, pp. 1-9.

Office action for U.S. Appl. No. 12/859,679, mailed on Sep. 25, 2013, Colvin, et al., "Reputation-based Safe Access User Experience", 15 pages.

Office action for U.S. Appl. No. 12/637,673, mailed on Oct. 25, 2013, Bhatawdekar, et al., "Reputation Based Redirection Service", 26 pages.

Office action for U.S. Appl. No. 12/859,679, mailed on Jan. 2, 2014, Colvin, et al., "Reputation-based Safe Access User Experience", 15 pages.

Office action for U.S. Appl. No. 12/637,673, mailed on Apr. 23, 2014, Bhatawdekar et al., "Reputation Based Redirection Service", 20 pages.

Office action for U.S. Appl. No. 12/859,679, mailed on May 14, 2014, Colvin et al., "Reputation-based Safe Access User Experience", 18 pages.

Final Office Action for U.S. Appl. No. 12/859,679, mailed on Jul. 28, 2014, Colvin, et al., "Reputation-based Safe Access User Experience", 21 pages.

Office action for U.S. Appl. No. 12/859,679, mailed on Jun. 11, 2015, Colvin et al., "Reputation-based Safe Access User Experience", 19 pages.

"Actipro SyntaxEditor—Windows Forms .NET Control", available at least as early as Feb. 22, 2007, at <<http://www.actiprosoftware.com/Products/DotNet/WindowsForms/SyntaxEditor/SmartTag>>, Actipro Software LLC, 1999-2007, pp. 1-2.

"Complete Tasks Quickly with Smart Tags in Office XP", available at least as early as Feb. 22, 2007, at <<http://office.microsoft.com/en-us/help/HA010347451033.aspx>>, Microsoft Corporation, 2007, pp. 1-11.

"Interfaces in Visual Studio 2005", available at least as early as Feb. 22, 2007, at <<http://safari.oreilly.com/0596102070/pnetcomp2-CHP-3-SECT-5>>, Safari Books Online, 2006, pp. 1-3.

"InterScan Web Security Suite 3.1", retrieved on Jun. 30, 2010 at <<http://www.mcafee.com/us/local_content/solution_briefs/web_gateway_sb.pdf>>, Trend Micro, 2008, pp. 1-2.

Josang, et al., "A Survey of Trust and Reputation Systems for Online Service Provision", retrieved on Jun. 30, 2010 at <<http://citeseerx.ist.psu.edu/viewdoc/download?doi=10.1.1.60.1963&rep=rep1&type=pdf>>, Elsevier Science Publishers, Decision Support Systems, vol. 43, No. 2, Mar. 2007, pp. 618-644.

* cited by examiner

ACCESSIBLE CONTENT REPUTATION LOOKUP

RELATED APPLICATION

This application claims priority to U.S. patent application Ser. No. 11/759,401 to Iverson, entitled, "Accessible Content Reputation Lookup", filed on Jun. 7, 2007 and published as U.S. Patent Application Publication No. 2008/0303689, which is incorporated here by reference.

BACKGROUND

Users of computing-based devices have become accustomed to the benefits of interacting with documents having links to related content. For instance, a news page on the Internet can include a report having numerous links to more detailed information on persons or other entities mentioned in the report. In this way, the report can be very concise, yet still afford readers the opportunity to explore a wide variety of related content from other sources.

Unfortunately, however, by following links, accessing information, or downloading software from other sources, users can often open up their computing-based devices to attack. For example, by blindly following a link on a webpage a user can unwittingly access a dangerous website, such as a phishing website or a website disseminating malicious software, such as malware.

SUMMARY

Implementations of accessible content reputation lookup are described. In one implementation, before a user activates a link in a document, such as a hyperlink on a webpage, the user can designate the link. For example, the user can float a cursor over the link or interact with an icon placed proximate to the link. By designating the link, the user can request reputation information associated with the link, including information as to whether or not content and applications associated with the link, and/or source(s) on which the content resides, are known to be dangerous or risky.

If the reputation information indicates that the link is safe to activate, the user can activate the link and access the content. Alternately, if the reputation information indicates that the link is unsafe to access, the user can choose to forego activation of the link.

This summary is provided to introduce a selection of concepts that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

This disclosure is directed to techniques for accessible content reputation lookup. More particularly, the techniques described herein involve allowing a user to request reputation information associated with a link in a document—such as a link to content outside of the document—before the user activates the link. The reputation information can include a reputation of content associated with the link, a reputation of one or more applications used to access content associated with the link, and/or a reputation of one or more sources on which the content can be stored.

For example, a user can instigate retrieval of reputation information associated with a specific link on a webpage by floating a cursor over the link or by interacting with an icon proximate the link. Based on the returned reputation information, the user can decide if it is safe to activate the link and access content and/or one or more sources associated with the link.

Exemplary Environment

Figure 1:
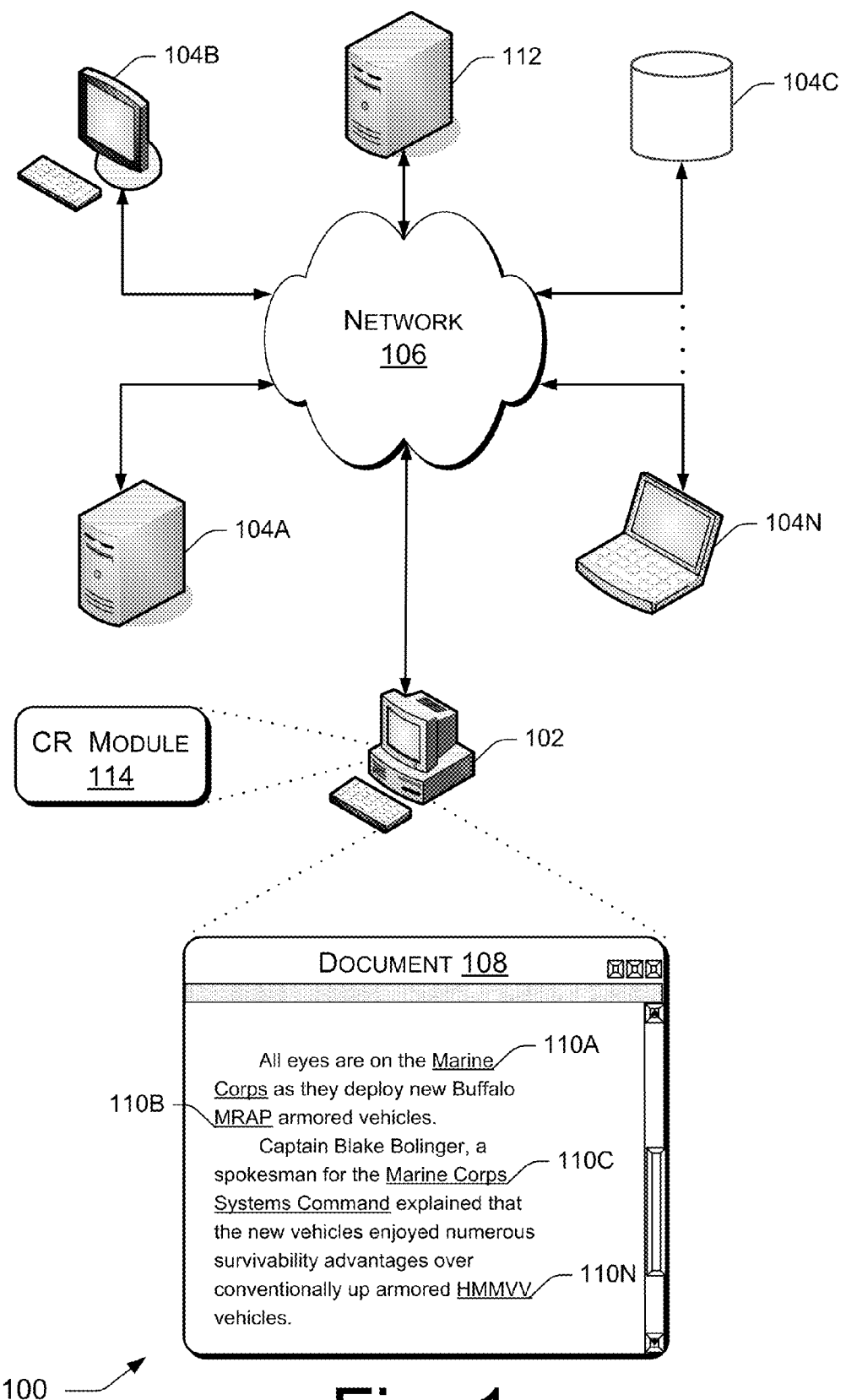
FIG. 1 illustrates an exemplary environment in which accessible content reputation lookup may be implemented.

FIG. 1 illustrates an exemplary environment 100 in which accessible content reputation lookup may be implemented. Environment 100 includes a client device 102 which can be placed in communication with a variety of computing-based devices 104A-N via a network 106. Client device 102 can include any computing-based device which can be used to access a document 108. For example, client device 102 can include a server, a game console, a desktop PC, a notebook or portable computer, a workstation, a mainframe computer, an Internet appliance, a mobile phone, a personal digital assistant (PDA), a printer, and so on. Similarly document 108 can include any file or data structure through which information may be presented to a user. Thus document 108 can include various files associated with applications such as word processors, spreadsheets, web browsers, instant messaging applications, email applications, and so on.

Network 106 can include any wired and/or wireline coupling known in the art capable of placing two or more computing-based devices in electronic communication. Examples of network 106 include a local area network (LAN), a wide area network (WAN), the Internet, a conventional telephone network, a cellular network, any combination thereof, etc.

Devices 104A-N with which client device 102 may communicate include any computing-based devices known in the art. For example, devices 104A-N can include a server 104A, a PC 104B, a storage device 104C, a laptop 104N, and so on.

As shown, document 108 can include links 110A-N through which a user interacting with document 108 can access a wide variety of content on client device 102 and devices 104A-N. Links 110A-N can include pluggable protocols, and any other mechanisms or methods known in the art through which a user viewing document 108 can be given an option to access content from various sources. For instance, a user interacting with document 108 can activate a link 110A-N to access content residing on client device 102 and/or devices 104A-N, such as a uniform resource locator (URL), a file for a word processing application, a file for a spreadsheet application, an image file, an audio file, a video file, a binary download (including an executable file such as a .exe file), and so on.

Unfortunately, however, the user at client device 102 may have no reputation information regarding the trustworthiness of either the content, applications used to access the content, or devices on which the content may reside. Thus, by haphazardly activating links 110A-N the user can blindly access dangerous content, applications, and/or sources, subjecting client device 102 to unacceptable risks, such as infection by malware, tampering by outside entities, and release of sensitive files or settings from client device 102.

For example, some of devices 104A-N could have strong histories of disseminating malware. Similarly, some of devices 104A-N could be well-known for long access times. Conversely, some of devices 104A-N could be known as secure sites with excellent reputations for disseminating safe content free from malware.

Moreover, some content accessible via links 110A-N may have important associated history. For instance, it may be well-known that some content associated with links 110A-N is of poor quality, or includes malware. Alternately, some content associated with other links 110A-N may be well-known for being safe, and being devoid of malware.

Similarly, applications launched to access content once links 110A-N are activated may have associated histories. For example, a media player or web browser associated with activation of link 110A-N may be obsolete, incompatible with the content, or otherwise have exhibited various defects and/or undesirable attributes. Alternately, an application associated with activation of link 110A-N may be safe and devoid of undesirable attributes. The term "application", as used herein, can include software modules.

The histories of devices 104A-N, as well as the histories of content associated with links 110A-N, and the histories of applications associated with links 110A-N can be collected and saved as reputation information. Reputation information can include historical information from previous interactions with devices 104A-N by users at device 102, as well as historical information from previous interactions with devices 104A-N by users at other computing based-devices. Further, reputation information can include ratings of content and devices 104A-N compiled by ratings organizations and/or other interested parties. Thus, reputation information can include any information that might allow a user at client device 102 to assess a risk of activating a link 110A-N and interacting with content, applications, and/or sources associated with link 110A-N.

Reputation information can be stored in one or more of several locations. For example, in one implementation, reputation information can be stored on a reputation server 112 coupled to client device 102 by network 106. Reputation server 112 can include any computing-based device known in the art, including a server, a desktop PC, a notebook or portable computer, a workstation, a mainframe computer, an Internet appliance, a storage device, and so on.

In another possible implementation, reputation information can be stored in memory on client device 102. In still another possible implementation, reputation information can be stored on both client device 102 and reputation server 112. For example, a cache storing reputation information on client device 102 can periodically synchronize itself with a cache storing reputation information on reputation server 112. Alternately, the cache on client device 102 can store a subset of reputation information stored on reputation server 112, such as reputation information which is frequently accessed from server 112 by client device 102, or reputation information having a character that doesn't often change.

In one implementation, when a user accesses document 108 on client device 102, a content reputation (CR) module 114 processes document 108 to identify links 110A-N for which reputation information is available. For instance, CR module 114 can identify links 110A-N for which reputation information regarding associated devices 104A-N and/or content is available and distinguish those links from other links. In one possible implementation, CR module 114 can scan document 108 and upon detecting a link 110A-N, CR module 114 can effect a query of a local cache (if one exists) on client device 102 and/or a remote cache on reputation server 112 and attempt to find reputation information associated with the link. This can be done link by link until all links 110A-N in document 108 have been investigated.

Links 110A-N having corresponding reputation information can then be identified by CR module 114. Identification of links 110A-N can be accomplished in many ways. For example, links 110A-N for which reputation information is available can be set off in a color different from that of other links 110A-N for which reputation information is not available. Alternately, links 110A-N for which reputation information is available can be highlighted by any way known in the art. In still another possible implementation, icons such as tags can be placed proximate to links 110A-N for which reputation information is available. Such icons can be activated to reveal pull down menus, as will be discussed in more detail in conjunction with FIGS. 1a and 1b below.

Alternately, in another possible implementation, CR module 114 can ignore a status of links 110A-N with regard to availability of reputation information. For example, all links 110A-N can be indicated as normal links in document 108.

To request reputation information for a link 110A-N, a user need only designate link 110A-N. For instance, the user can float a cursor over link 110A-N without clicking link 110A-N. Alternately, the user can place a cursor over link 110A-N and hit a mouse button or keyboard button not associated with activation of link 110A-N. In still another possible implementation, the user can interact with an icon proximate to link 110A-N.

Designation of link 110A-N in this way stimulated CR module 114 to instigate retrieval of reputation information associated with link 110A-N and display the reputation information to a user at client device 102. For example, CR module 114 can query reputation server 112 for reputation information associated with designated link 110A-N. Alternately, if a local cache exists on client device 102 in which reputation information is stored, CR module 114 can query the local cache for reputation information associated with designated link 110A-N. If this fails to produce the desired reputation information, CR module 114 can query reputation server 112 for the reputation information.

Once reputation information is received for designated link 110A-N, the reputation information can be displayed in any way known in the art. For example, the reputation information can be presented in a pop up window. Alternately, the reputation information can be presented in a margin proximate to designated link 110A-N. In yet another possible implementation, the reputation information can be displayed in a pull down menu.

In the event that no reputation information exists for a designated link 110A-N, CR module 114 can present information to that effect. For example, using the methods described above, CR module 114 can return one or more messages such as "no reputation information exists for this link", "no reputation information exists for content accessible via activation of this link", "no reputation information exists for applications associated with this link", and "no reputation information exists for source(s) associated with this link".

When no reputation information for designated link 110A-N is accessible, or when the reputation information for designated link 110A-N indicates a risk of activating link 110A-N, CR module 114 can present users at client device 102 with a warning advising them to forego activating designated link 110A-N, or to activate designated link 110A-N at their own risk.

Figure 1A:
FIG. 1a illustrates a tag that can be used with embodiments of accessible content reputation lookup.

FIG. 1a illustrates the use of an icon to indicate a link 110A-N for which reputation information is available. As shown, a tag 116 has been placed proximate link 110C for which reputation information is available. It will be understood that link 110C is only used as an example. Tag 116 could be used in conjunction with any of links 110A-N.

Additionally, in the implementation shown, tag 116 has been placed above and to the left end of link 110C. It will be understood, however, that tag 116 can be placed anywhere relative to link 110C so long as it is clear to a user that tag 116 corresponds to link 110C. For example, tag 116 can be placed above and to the right end of link 110C, below and to the left end of link 110C, on either side of link 110C, and so on.

Figure 1B:
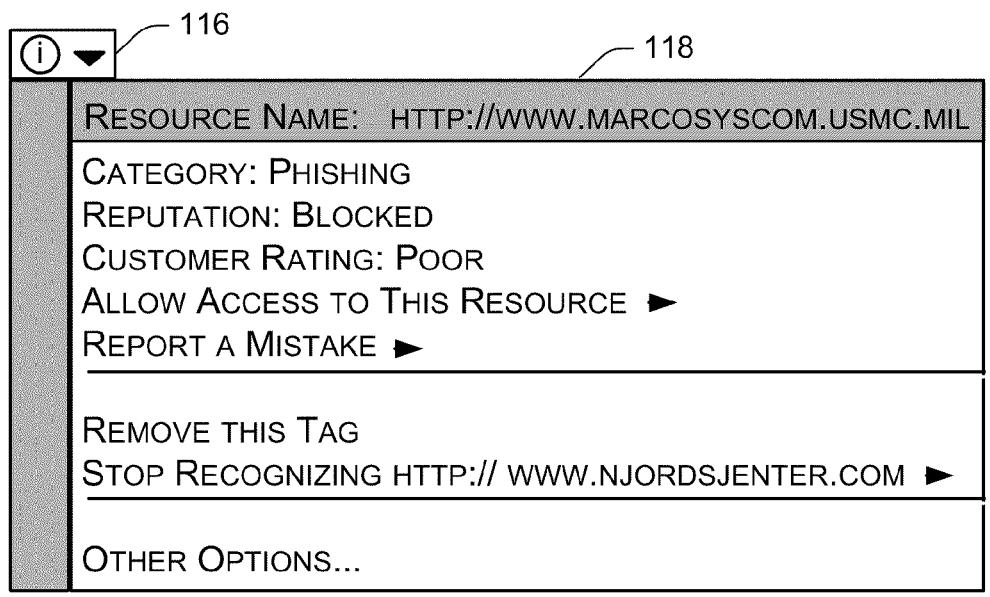
FIG. 1b illustrates a pull down menu that can be used with embodiments of accessible content reputation lookup.

FIG. 1b illustrates reputation information that can be displayed when tag 116 is activated. For example, when a user wishes to see reputation information associated with link 110C, the user can interact with tag 116, such as by clicking tag 116, and a pull down menu such as pull down menu 118 can be displayed. Pull down menu 118 can include any known reputation information regarding content, applications, and sources (such as device(s) 104A-N, on which the content may reside) with which link 110C is associated.

For example, pull down menu 118 can indicate categories of problems concerning content, applications, and/or device(s) 104A-N associated with link 110C. As shown in FIG. 1b, the URL associated with link 110C can be reported as having a reputation of being a phishing site. Further, pull down menu 118 can indicate whether or not access to device(s) 104A-N with which link 110C is associated is blocked. For example, if the reputation information associated with link 110C indicates that link 110C is unsafe to follow, the user can be blocked from activating link 110C. Pull down menu 118 can also include a prompt allowing the user to override a block placed on accessing link 110C (if such a block exists).

Customer ratings of content, applications, and devices 104A-N with which link 110C is associated can also be included in pull down menu 118. Additionally, a prompt allowing the user to suggest augmentations or corrections to the reputation information can be included in pull down menu 118. Further, pull down menu 118 can allow the user to indicate that link 110C should no longer be identified by CR module 114 as a link for which reputation information exists.

Exemplary Client Device

Figure 2:
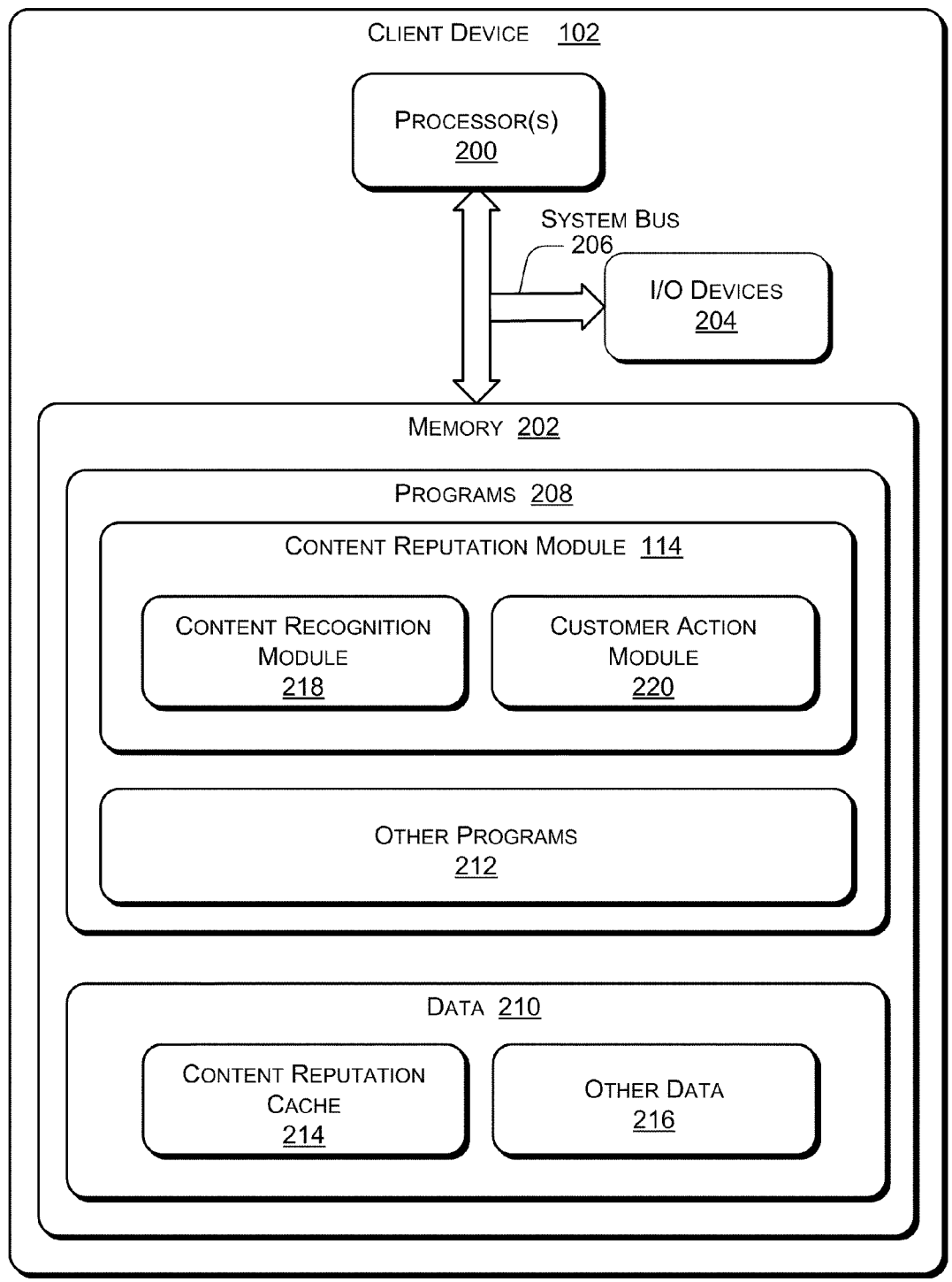
FIG. 2 illustrates an exemplary client device on which accessible content reputation lookup may be implemented.

FIG. 2 illustrates various components of client device 102 according to one embodiment of accessible content reputation lookup. Client device 102 can include one or more processor(s) 200, a memory 202, input/output (I/O) devices 204 (e.g., keyboard, display, and mouse), and a system bus 206 operatively coupling the various components of client device 102.

System bus 206 represents any of several types of bus structures, including a memory bus or memory controller, a peripheral bus, an accelerated graphics port, and a processor bus or local bus using any of a variety of bus architectures. By way of example, such architectures can include an industry standard architecture (ISA) bus, a micro channel architecture (MCA) bus, an enhanced ISA (EISA) bus, a video electronics standards association (VESA) local bus, a peripheral component interconnects (PCI) bus also known as a mezzanine bus, a PCI express bus, a universal serial bus (USB), a secure digital (SD) bus, and an IEEE 1394 (i.e., FireWire) bus.

Memory 202 can include computer-readable media in the form of volatile memory, such as RAM and/or non-volatile memory, such as ROM, or flash RAM. Memory 202 can also include data and program modules for implementing accessible content reputation lookup which are immediately accessible to, and presently operated on, by processor(s) 200.

Memory 202 can include programs 208 and data 210. Programs 208 can include content reputation (CR) module 114 as well as other programs 212, including, web browsing applications, instant messaging applications, word processing applications, spreadsheet applications, etc. For example, other programs 212 can include applications associated with links 110A-N, such as applications configured to access content when links 110A-N are activated.

Data 210 can include a content reputation cache 214 and other data 216, such as data associated with a general functioning of one or more programs—such as CR module 114 and other programs(s) 212.

CR module 114 includes a content recognition module 218 and a customer action module 220. In operation, once a user accesses document 108, such as by opening a web browser, an email, a word processing file, and so on, content recognition module 218 can process document 108 to identify any links 110A-N for which reputation information is available. For example, content recognition module 218 can stimulate customer action module 220 to perform queries for each link 110A-N in document 108 to see if corresponding reputation information exists in content reputation cache 214 and/or on reputation server 112. Alternately, content recognition module 218 can itself perform queries for each link 110A-N in document 108 to see if corresponding reputation information exists in content reputation cache 214 and/or on reputation server 112.

If reputation information for a link 110A-N is found, content recognition module 218 can distinguish link 110A-N from other links 110A-N for which reputation information is not available in a variety of ways. For example, content recognition module 218 can present links 110A-N for which reputation information is accessible in a color different from that of other links 110A-N for which reputation information is not available. Alternately, content recognition module 218 can cause links 110A-N for which reputation information is available to be highlighted by any way known in the art. In still another possible implementation, content recognition module 218 can cause icons such as tag 116, to be placed proximate to links 110A-N for which reputation information is available.

It will be understood that content reputation module 114 can also exist without content recognition module 218. For example, CR module 114 can ignore a status of links 110A-N with regard to availability of reputation information. For example, all links 110A-N can be indicated as normal links in document 108.

Whether links 110A-N have been processed by content recognition module 218 or not, customer action (CA) module 220 can allow users viewing document 108 to look up reputation information for one or more links 110A-N without having to activate links 110A-N.

In one implementation, CA module 220 enables a user to request reputation information for a link 110A-N, by allowing the user to designating link 110A-N. For example, the user can float a cursor over link 110A-N without clicking link 110A-N. Alternately, the user can place a cursor over the link 110A-N and hit a mouse button or keyboard button not associated with activation of link 110A-N. In still another possible implementation, the user can interact with an icon, such as tag 116, proximate to link 110A-N.

Once link 110A-N in designated, CA module 220 begins retrieval of reputation information associated with link 110A-N and displays the reputation information to the user. For example, CA module 220 can query content reputation cache 214 and/or reputation server 112 for reputation information associated with the designated link 110A-N. In one implementation, CA module 220 first queries content reputation cache 214 for reputation information associated with the designated link 110A-N. If reputation information associated with the designated link 110A-N cannot be found at content reputation cache 214, CA module 220 subsequently queries reputation server 112 for the reputation information.

Once CA module 220 receives reputation information for designated link 110A-N, the reputation information can be displayed in any way known in the art. For example, CA module 220 can effect the presentation of the reputation information in a pop up window, a pull down menu, or in a margin in document 108 proximate to designated link 110A-N.

In one possible implementation, if the reputation for designated link 110A-N indicates a risk to client device 102 of activating designated link 110A-N, CA module 220 can block the user from activating designated link 110A-N. CA module 220 can also present the user with an option to override this function, and activate designated link 110A-N despite the risk.

In the event that no reputation information exists for a designated link 110A-N, CA module 220 can present of information to this effect to a user and also include a warning advising the user to forego activation of designated link 110A-N. Alternately, CA module 220 can present a warning to the user to activate designated link 110A-N at the user's own risk.

Further, CA module 220 can present the user with an option to report a mistake with the presented reputation information and/or make changes to the reputation information. For example, if reputation information returned for designated link 110A-N is clearly erroneous, CA module 220 can allow the user can report it as such. CA module 220 can also allow the user to enter corrections to the reputation information.

Exemplary Reputation Server

Figure 3:
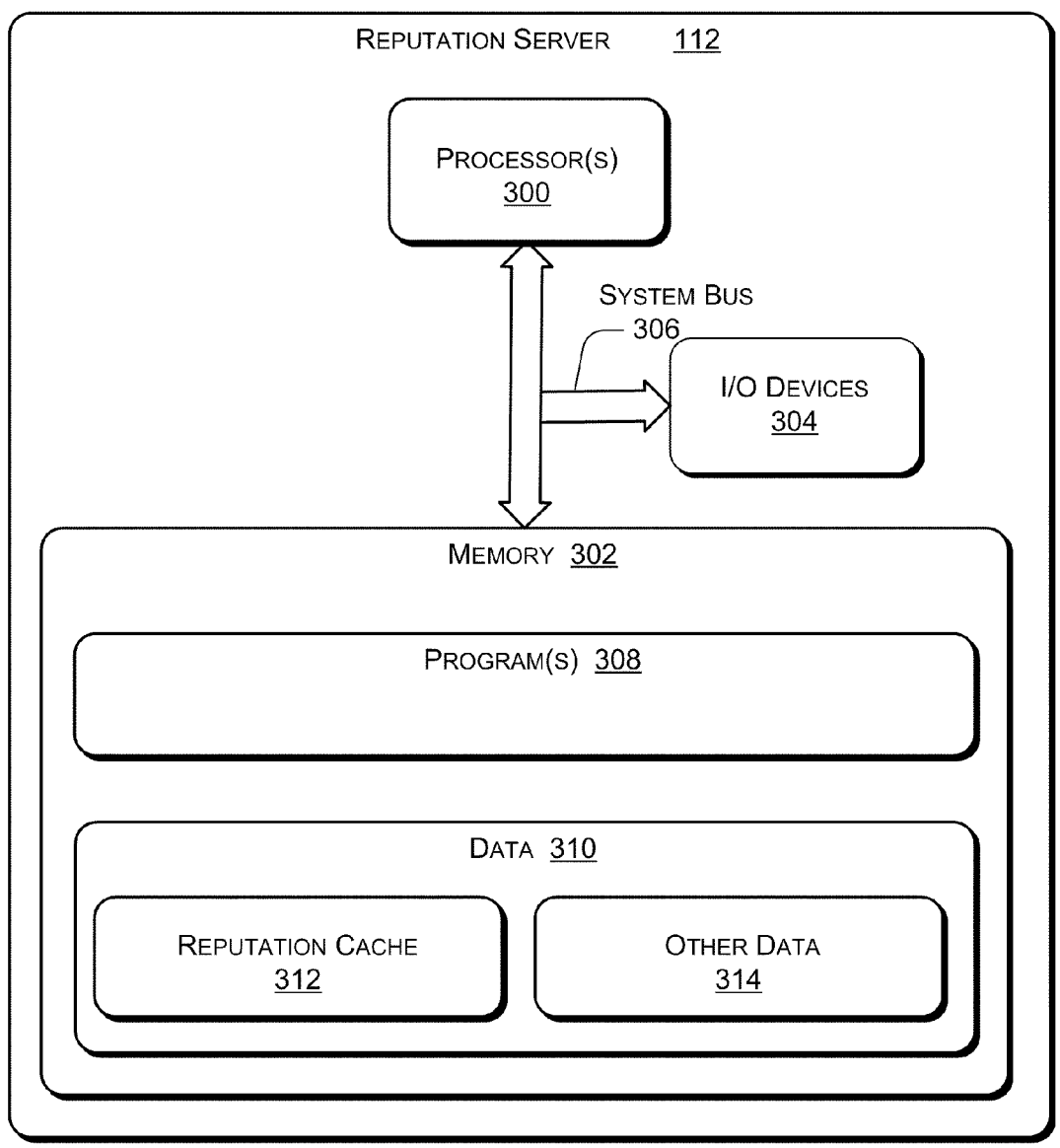
FIG. 3 illustrates an exemplary reputation server on which reputation information may be stored.

FIG. 3 illustrates various components of reputation server 112 in accordance with one embodiment of accessible content reputation lookup. Reputation server 120 can include one or more processor(s) 300, a memory 302, input/output (I/O) devices 304 (e.g., keyboard, display, and mouse), and a system bus 306 operatively coupling the various components of reputation server 112.

System bus 306 represents any of several types of bus structures, including a memory bus or memory controller, a peripheral bus, an accelerated graphics port, and a processor bus or local bus using any of a variety of bus architectures. By way of example, such architectures can include an industry standard architecture (ISA) bus, a micro channel architecture (MCA) bus, an enhanced ISA (EISA) bus, a video electronics standards association (VESA) local bus, a peripheral component interconnects (PCI) bus also known as a mezzanine bus, a PCI express bus, a universal serial bus (USB), a secure digital (SD) bus, and an IEEE 1394 (i.e., FireWire) bus.

Memory 302 can include computer-readable media in the form of volatile memory, such as RAM and/or non-volatile memory, such as ROM, or flash RAM. Memory 302 can also include data and program modules for implementing accessible content reputation lookup which are immediately accessible to, and presently operated on, by processor(s) 300.

Memory 302 can include programs 308 and data 310. Programs 308 can include programs such as file sharing applications, web browsing applications, word processing applications, spreadsheet applications, etc. Data 310 can include a reputation cache 312 and other data 314, such as data associated with a general functioning of one or more programs—such as programs(s) 308.

Reputation cache 312 can include reputation information associated with one or more links 110A-N. In one implementation, reputation information for a given link 110A-N includes information regarding a risk of activating link 110A-N. For example, reputation information can include historical information for content, applications, and sources associated with link 110A-N. This historical information can include access times for content and sources associated with link 110A-N as well as known reputations for content, applications, and sources associated with link 110A-N (for example, if a source, application, or content is known to be secure or not, or if a source, application, or content is known to disseminate malware or not).

Reputation information stored in reputation cache 312 can be derived from previous interactions with devices 104A-N by users at device 102, as well as from previous interactions with devices 104A-N by users at other computing based-devices. Further, reputation information stored in reputation cache 312 can include ratings of content, applications, and devices 104A-N compiled by ratings organizations and/or other interested parties.

As noted above, all or part of the reputation information stored in reputation cache 312 can be the same as reputation information stored in content reputation cache 214. For example, reputation cache 312 can be periodically synchronized with content reputation cache 214.

Exemplary Methods

Figure 4:
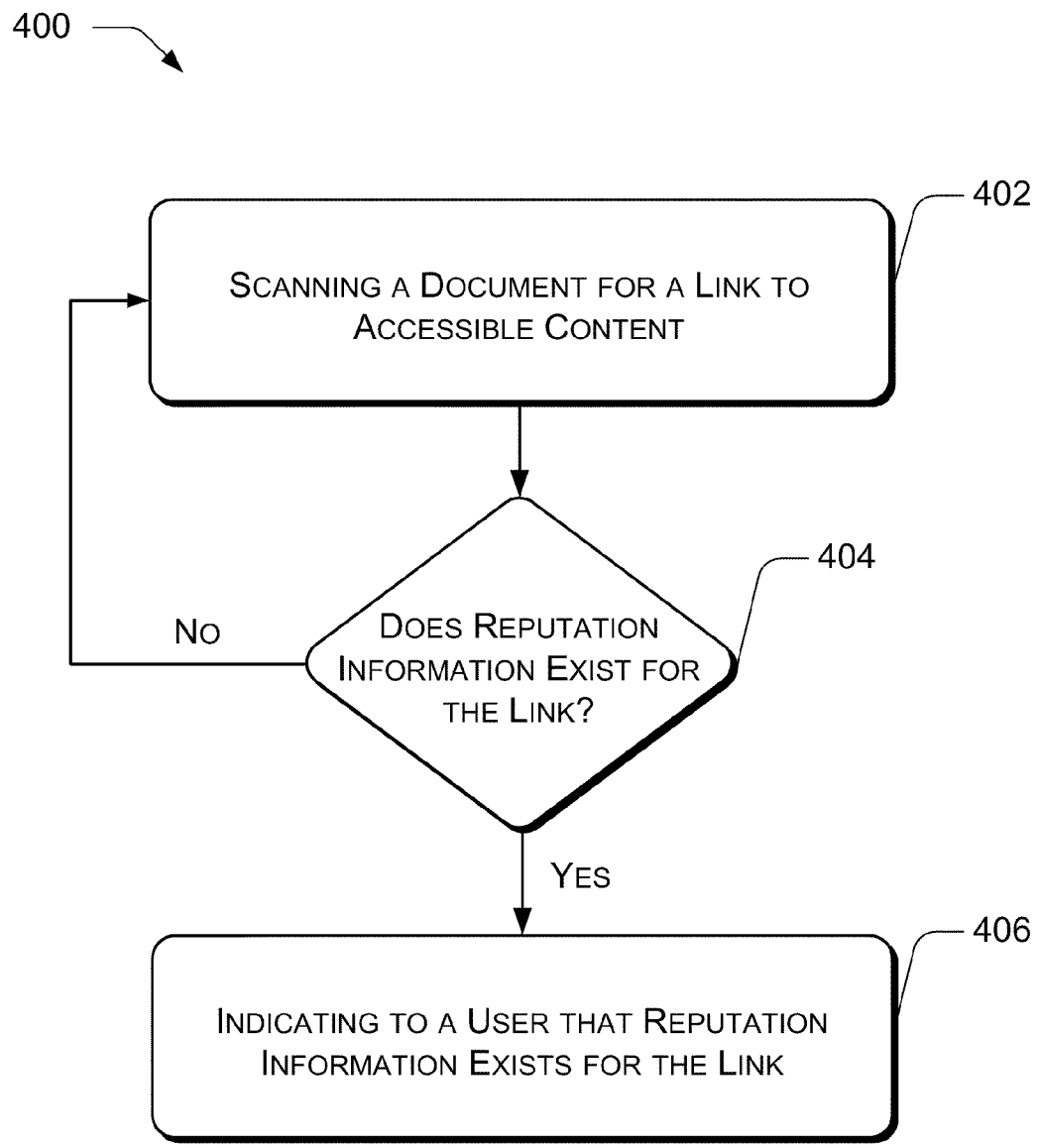
FIG. 4 illustrates an exemplary process for identifying links to accessible content for which reputation information is available.
Figure 5:
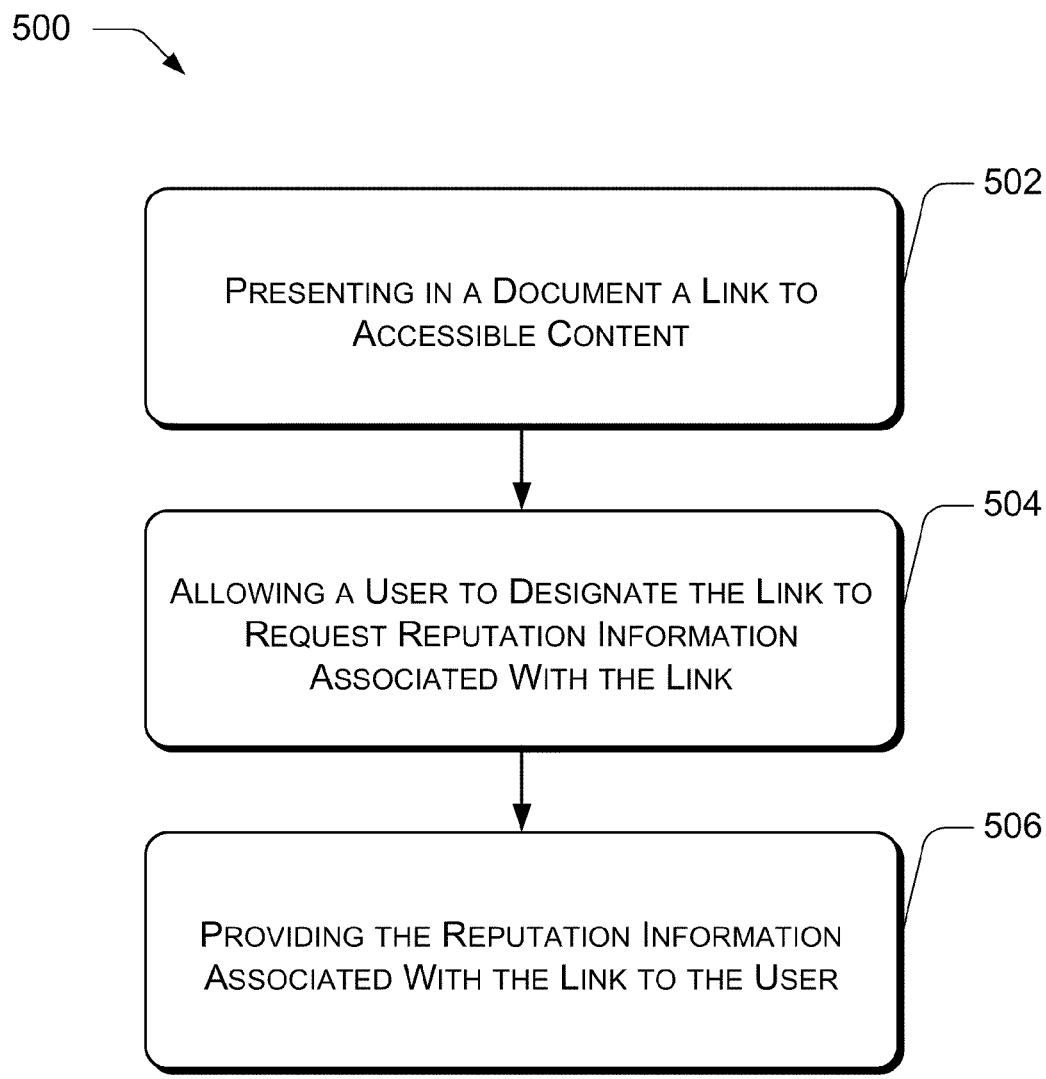
FIG. 5 illustrates an exemplary process for accessible content reputation lookup.
Figure 6:
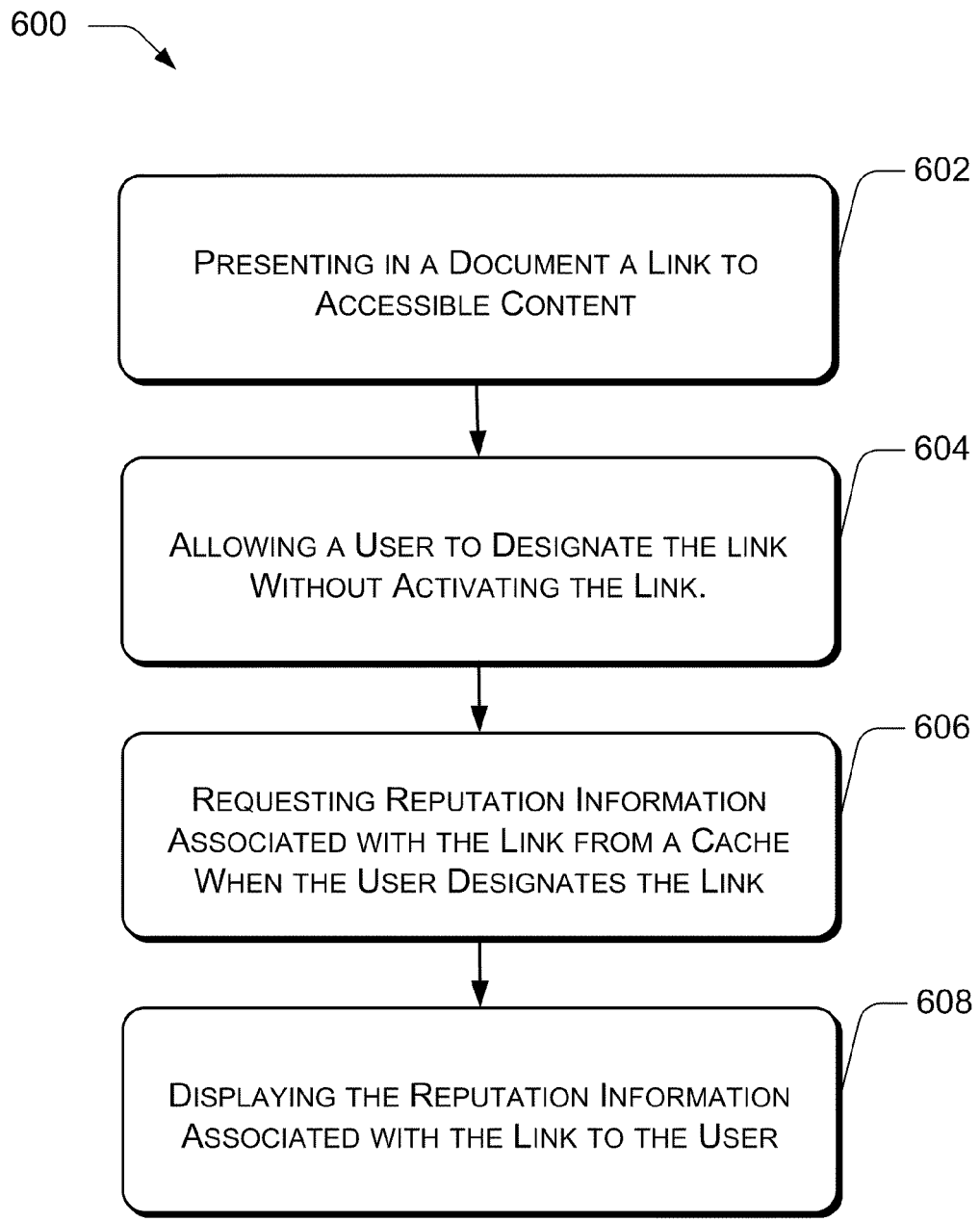
FIG. 6 illustrates another exemplary process for accessible content reputation lookup.

FIGS. 4-6 illustrate exemplary methods for implementing aspects of accessible content reputation lookup. The methods are illustrated as a collection of blocks in a logical flow graph representing a sequence of operations that can be implemented in hardware, software, firmware or a combination thereof. The order in which the methods are described is not intended to be construed as a limitation, and any number of the described method blocks can be combined in any order to implement the methods, or alternate methods. Additionally, individual blocks may be deleted from the methods without departing from the spirit and scope of the subject matter described therein. In the context of software, the blocks can represent computer instructions that, when executed by one or more processors, perform the recited operations. Moreover, for discussion purposes, and not purposes of limitation, selected aspects of the methods may be described with reference to elements shown in FIGS. 1-3.

Exemplary Method I

FIG. 4 illustrates an exemplary method 400 for identifying links to accessible content for which reputation information is available. At block 402, a document, such as document 108, is scanned for the existence of a link to accessible content, such as links 110A-D to content on devices such as client device 102 and devices 104A-N. For example, a module such as content recognition module 218, can scan a document and find a next available link to accessible content in the document.

At block 404, reputation information for the link found at block 402 can be sought in one or more caches on a local computing based device and/or a remote computing based device. For example, content recognition module 218 can query content reputation cache 214 on client device 102 and/or reputation cache 312 on reputation server 120 for reputation information associated with the link found at block 402.

If reputation information for the link is not found ("no" path from block 404), method 400 can return to block 402 and scan for another link to accessible content in the document.

Alternately, if reputation for the link is found ("yes" path from block 404), the link is indicated as a link for which reputation information exists. In one implementation, the link can be presented in a color different than that of surrounding text and other links in the document for which no reputation information can be accessed. In another implementation, the link for which reputation information exists can be highlighted. In yet another implementation, an icon, such as tag 116, can be placed close to the link for which reputation information exists.

Exemplary Method II

FIG. 5 illustrates an exemplary method 500 for accessible content reputation lookup. At block 502, at least one link to accessible content in a document is presented to a user. For example, one or more links, such as links 110A-N, can be presented to a user in a document, such as document 108. The links can allow a user interacting with the document to access a wide variety of content. For example, the links can allow the user to access content on a computing-based device on which the user is viewing the document, such as client device 102, as well as from other devices electrically coupled to the computing-based device on which the user is viewing the document, such as devices 104A-N.

At block 504, the user is given the option of requesting reputation information associated with a selected link in the document by designating the link. Reputation information can include information enabling the user to assess a risk of activating the link. For example, reputation information can include information relating to a reliability of content associated with the link, information relating to a reliability of one or more applications configured to access the content upon activation of the link, and information relating to a reliability of one or more sources, such as device 102 and devices 104A-N, on which the content may reside. For example, the reputation information can indicate a tendency and/or likelihood of the content, application(s), and/or source(s) associated with the designated link to disseminate malware or otherwise cause problems on the computing-based device. Additionally, the reputation information can include data on access times for retrieving the content from the source(s).

Historical information from previous interactions with the content, application(s), and sources(s) associated with the link can be used to compile the reputation information. Such historical information can include interactions initiated from the computing-based device on which the user is viewing the document, as well as interaction initiated from other computing based devices being used by other users.

The reputation information can also include ratings of content, application(s), and source(s) associated with the link compiled by ratings organizations and/or other interested parties.

The user can designate the link for which reputation information is sought using several techniques short of activating the link. For example, the user can float a cursor over the link, place a cursor over the link and hit a mouse button or keyboard button not associated with activation of the link, and can interact with an icon, such as tag 116, proximate to the link.

At block 506, reputation information associated with the link designated in block 504 can be provided to the user. In one implementation, a module such as customer action module 220 can instigate both retrieval of reputation information associated with the link and display of the reputation information to the user. For example, the module can query either or both of the computing based device on which the user is viewing the document and a reputation server reputation server, such as reputation server 112, for reputation information associated with the designated link. In this way a local cache, such as content reputation cache 214, on the computing based device on which the user is viewing the document, as well as a remote cache, such as reputation cache 312, on the reputation server can be queried. In one implementation, the local cache can be queried first for the reputation information associated with the designated link, and if this fails to produce the desired reputation information, the remote cache on the reputation server can be queried for the reputation information.

Once reputation information is received for the designated link the reputation information can be displayed to the user in any way known in the art. For example, the reputation information can be presented in a pop up window. Alternately, the reputation information can be presented in a margin in the document proximate to the designated link. In still another exemplary implementation, the reputation information can be presented in a pull down menu, such as pull down menu 118.

In the event that no reputation information exists for the designated link, the reputation information presented to the user can include information stating that no formal reputation information can be found. For example, one or more messages such as "no reputation information exists for this link", "no reputation information exists for content accessible via activation of this link", "no reputation information exists for applications associated with this link" and "no reputation information exists for source(s) associated with this link" can be presented as reputation information to the user. A warning advising users to forego activating the designated link in the absence of formal reputation information can also be presented to the user.

Exemplary Method III

FIG. 6 illustrates another exemplary method 600 for accessible content reputation lookup. At block 602, a link to accessible content is presented in a document. For example, a link, such as link 110A-N, can be presented to a user in a document such as document 108. The link can allow the user to access a wide variety of content, such as content on a computing-based device, like client 102, the user is using to view the document, as well as content on other devices, like devices 104A-N, coupled to the computing-based device on which the user is viewing the document.

At block 604, the user is given the option of requesting information associated with the link by designating the link without activating the link. The user can designate the link using several techniques, including floating a cursor over the link, placing a cursor over the link and hitting a mouse button or keyboard button unassociated with activation of the link, and interacting with an icon, such as tag 116, proximate to the link.

At block 606, reputation information associated with the link can be requested from a cache when the user designates the link. Reputation information can include any information enabling the user to assess a risk of activating the link, such as information relating to a reliability of content associated with the link, information relating to a reliability of one or more applications associated with the link, and information relating to a reliability of one or more sources, such as device 102 and devices 104A-N, on which the content may reside. For example, the reputation information can include any known history of malware dissemination by the content, application(s) and/or source(s) associated with the designated link. Additionally, the reputation information could include data on access times for retrieving the content from the source(s).

The reputation information associated with the designated link can also include historical information from previous interactions with the content, application(s), and sources(s). For example, the reputation information can include information from interactions with the content, application(s), and source(s) associated with the designated link initiated from the computing-based device on which the user is viewing the document. The reputation information can also include information from interactions with the content, application(s), and source(s) associated with the designated link initiated on other computing based devices being used by other users. Additionally, the reputation information can include ratings of content, application(s), and source(s) associated with the designated link compiled by ratings organizations and/or other interested parties.

In one implementation, a module, such as customer action module 220, can request retrieval of reputation information associated with the designated link. For example, the module can query either or both of the computing based device on which the user is viewing the document and a reputation server, such as reputation server 112, for reputation information associated with the designated link. In this way a local cache, such as content reputation cache 214, on the computing based device on which the user is viewing the document, as well as a remote cache, such as reputation cache 312, on the reputation server can be queried. In one implementation, the local cache can be queried first for the reputation information associated with the designated link, and if this fails to produce the desired reputation information, the remote cache on the reputation server can be queried for the reputation information.

At block 608, the reputation information associated with the designated link is displayed to the user. The reputation information can be displayed to the user in any way known in the art. For example, the reputation information can be presented in a pop up window, in a margin proximate to the designated link, or in a pull down menu, such as pull down menu 118, associated with the designated link.

In the event that no reputation information exists for the designated link, the reputation information presented to the user can include information stating that no formal reputation information can be found. Moreover, a warning advising users to forego activation of the designated link in the absence of reputation information can also be presented to the user.

CONCLUSION

Although embodiments of accessible content reputation lookup have been described in language specific to structural features and/or methods, it is to be understood that the subject of the appended claims is not necessarily limited to the specific features or methods described. Rather, the specific features and methods are disclosed as exemplary implementations of accessible content reputation lookup.

What is claimed is:

1. A computer implemented method operable on a processor, the method comprising:
   presenting in text of a web page a first link to first content;
   presenting in the text of the web page a second link to second content;
   presenting, in a first state, proximate to the first link in the text of the webpage a first icon corresponding to the first link, wherein the first state of the first icon indicates that first reputation information associated with the first link is available, the first reputation information including a history of an application associated with the first link to the first content and a history of a device storing the first content, the history of the device indicating a reputation for the device based on a likelihood of the device to disseminate malware and a length of an access time for retrieving content from the device;
   presenting, in a second state, proximate to the second link in the text of the webpage a second icon corresponding to the second link, wherein the second state of the second icon is different than the first state of the first icon and indicates that second reputation information associated with the second link is not available;
   receiving input designating the first link by floating a cursor over the first icon associated with the first link to request the first reputation information associated with the first link;
   displaying a pull down menu extending from the first icon and over the text of the web page when the user designates the first link; and
   displaying, in the pull down menu, the first reputation information associated with the first link.

2. The method of claim 1, further comprising receiving input to designate the first link by floating a cursor over the first link.

3. The method of claim 1, further comprising querying a local cache for the first reputation information.

4. The method of claim 3, further comprising querying a cache on a remote device when the first reputation information is not available in the local cache.

5. The method of claim 1, further comprising displaying that no reputation information can be returned when the first reputation information cannot be accessed.

6. The method of claim 1, further comprising blocking activation of the first link when the first reputation information indicates a risk in accessing the content associated with the first link.

7. The method of claim 1, further comprising receiving input including comments regarding a quality of the first reputation information.

8. A device having computer-readable instructions residing thereon that, when executed, performs operations comprising:
presenting in text of a web page a first link to first content;
presenting in the text of the web page a second link to second content;
presenting a first icon, corresponding to the first link, in a first state proximate to the first link in the text of the web page indicating first reputation information associated with the first link is available, the first reputation information including a history of an application associated with the first link to the first content and a history of a computing device storing the first content, the history of the computing device indicating a reputation for the computing device based on a likelihood of the computing device to disseminate malware and a length of an access time for retrieving content from the computing device;
presenting a second icon, corresponding to the second link, in a second state proximate to the second link in the text of the web page, the second state of the second icon being different than the first state of the first icon and indicating second reputation information associated with the second link is not available;
receiving a user input designating the first link without activating the first link by floating a cursor over the first icon;
requesting the first reputation information associated with the first link from a cache when the user designates the first link;
displaying a pull down menu extending from the first icon and over the text of the web page; and
displaying, in the pull down menu, the first reputation information associated with the first link.

9. The device of claim 8 having computer-readable instructions residing thereon that, when executed, perform operations further comprising:
prepopulating the cache with first reputation information for the first link.

10. The device of claim 8 having computer-readable instructions residing thereon that, when executed, perform operations further comprising:
displaying a warning recommending that the user forego activation of the first link when too little reputation information exists in the cache to indicate that a risk of activating the first link is below an acceptable threshold.

11. A computing device, comprising:
a hardware processor;
a computer-readable memory coupled to the hardware processor, the computer-readable memory including computer-readable instructions that when executed by the hardware processor perform operations comprising:
displaying in text of a web page a first link to first content;
displaying in the text of the web page a second link to second content;
displaying a first icon, corresponding to the first link, in a first state proximate to the first link in the text of the web page indicating first reputation information associated with the content is available, the first reputation information including a history of an application associated with the first link to the first content and a history of a device storing the first content, the history of the device indicating a reputation for the device based on a likelihood of the device to disseminate malware and a length of an access time for retrieving content from the device;
displaying a second icon, corresponding to the second link, in a second state proximate to the second link in the text of the web page, wherein the second state of the second icon is different than the first state of the first icon and indicates that second reputation information associated with the second link is not available;
displaying a pull down menu extending from the first icon and over the text of the web page when a user interacts with the first icon; and
displaying, in the pull down menu, the first reputation information associated with the content.

12. The computing device of claim 11, the computer-readable memory further including computer-readable instructions that when executed by the hardware processor perform operations comprising:
receiving user input providing comments regarding a quality of the first reputation information.

13. The computing device of claim 11, further comprising a local cache, wherein the computing device attempts to retrieve the first reputation information from the local cache before attempting to retrieve the first reputation information from a cache residing on a remote computing device.

14. The computing device of claim 11, wherein displaying the first icon proximate to the first link in the text of the web page comprises displaying the first icon above or below a left end of the first link in the text of the web page, or displaying the first icon above or below a right end of the first link in the text of the web page.

15. The method of claim 1, wherein presenting the first icon proximate to the first link in the text of the web page comprises displaying the first icon adjacent to a left end or right end of the first link in the text of the web page.

16. The device of claim 8, wherein presenting the first icon proximate to the first link in the text of the web page comprises displaying the first icon adjacent to a left end or right end of the first link in the text of the web page.

17. The computing device of claim 11, wherein displaying the first icon proximate to the first link in the text of the web page comprises displaying the first icon adjacent to a left end or right end of the first link in the text of the web page.

* * * * *